United States Patent
Cheng et al.

(10) Patent No.: US 6,483,631 B1
(45) Date of Patent: Nov. 19, 2002

(54) OPTICAL AMPLIFIER SPECTRAL TILT CONTROLLERS

(75) Inventors: Yuh-Jen Cheng, San Jose, CA (US); Rene H. Monnard, Sunnyvale, CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/900,137

(22) Filed: Jul. 9, 2001

Related U.S. Application Data
(60) Provisional application No. 60/295,576, filed on Jun. 5, 2001.

(51) Int. Cl.[7] .................................................. H01S 3/00
(52) U.S. Cl. ................................ 359/337.11; 359/337.1
(58) Field of Search ......................... 359/337.1, 337.11, 359/337.2, 337, 337.21, 337.22

(56) References Cited

U.S. PATENT DOCUMENTS

| | | | |
|---|---|---|---|
| 5,253,104 A | | 10/1993 | Delavaux ..................... 359/341 |
| 5,436,760 A | * | 7/1995 | Nakabayashi ................ 359/341 |
| 5,583,689 A | * | 12/1996 | Cassidy et al. .............. 359/341 |
| 5,861,981 A | | 1/1999 | Jabr ............................ 359/341 |
| 5,864,581 A | | 1/1999 | Alger-Meunier et al. ... 375/224 |
| 5,933,552 A | | 8/1999 | Fukushima et al. ........... 385/24 |
| 5,969,834 A | | 10/1999 | Farber et al. ................ 359/110 |
| 6,016,213 A | | 1/2000 | Farber et al. ................ 359/177 |
| 6,057,959 A | | 5/2000 | Taylor et al. ................ 359/341 |
| 6,061,171 A | | 5/2000 | Taylor et al. ................ 359/341 |
| 6,115,174 A | | 9/2000 | Grubb et al. ................ 359/334 |
| 6,151,157 A | | 11/2000 | Ball et al. .................... 359/341 |
| 6,160,659 A | | 12/2000 | Kinoshita .................... 359/337 |
| 6,198,570 B1 | | 3/2001 | Fukushima et al. ......... 359/337 |
| 6,215,581 B1 | | 4/2001 | Yadlowsky .................. 359/337 |
| 6,307,691 B1 | * | 10/2001 | Goosen ....................... 359/885 |
| 6,359,726 B1 | * | 3/2002 | Onaka et al. ............. 359/337.1 |

FOREIGN PATENT DOCUMENTS

| | | |
|---|---|---|
| EP | 762 667 A2 | 3/1997 |
| JP | 11-275027 A2 | 8/1999 |
| WO | WO 97/28584 | 8/1997 |
| WO | WO 99/66607 | 12/1999 |
| WO | WO 99/67609 | 12/1999 |
| WO | WO 00/4613 A1 | 1/2000 |
| WO | WO 00/14909 | 3/2000 |
| WO | WO 00/49721 | 8/2000 |

OTHER PUBLICATIONS

Zhu et al. "1.28 Tbit/s (32×40 Gbit/s) Transmission over 1000 km NDSF Employing Distributed Raman Amplification and Active Gain Flattening" Electronics Letters, vol. 37, No. 1, p. 43–45 (Jan. 4, 2001).

Ono et al. "Automatic Gain Control in Silica–Based EDFA with over 50nm Flat Gain Bandwidth using an all Optical Feedback Loop" 10th Optical Amplifiers and their Applications Technical Digest, Jun. 9–11, 1999, p. 80–83.

Takeda et al. "Active Gain Tilt Equalization by Preferentially 1.43 $\mu$m–or 1,48$\mu$m–Pumped Raman Amplification" OSA Optical Amplifiers and their Applications, vol. 30, p. 101–105 (1999).

* cited by examiner

*Primary Examiner*—Mark Hellner
(74) *Attorney, Agent, or Firm*—Fish & Neave; G. Victor Treyz

(57) ABSTRACT

Spectral tilt controllers are provided for optical amplifiers and other optical network equipment used in fiber-optic communications links in fiber-optic networks. The tilt controllers may be used to adjust the gain or output power spectrum of an optical amplifier or to modify the optical data signal spectrum in other optical network equipment. Tilt controllers may use mechanical actuators to position a filter element substrate relative to an optical beam. Dielectric filters or other filter arrangements having various different spectral tilt characteristics may be implemented on the same substrate. Spectral tilt and average spectral attenuation values may be adjusted using the tilt controllers if desired.

4 Claims, 7 Drawing Sheets

| $T_{11}$ | $T_{12}$ | $T_{13}$ | $T_{14}$ |
|---|---|---|---|
| $T_{21}$ | $T_{22}$ | $T_{23}$ | $T_{24}$ |
| $T_{31}$ | $T_{32}$ | $T_{33}$ | $T_{34}$ |
| $T_{41}$ | $T_{42}$ | $T_{43}$ | $T_{44}$ |

OPTICAL AMPLIFIER SPECTRAL TILT CONTROLLERS

This application claims the benefit of provisional patent application No. 60/295,576, filed Jun. 5, 2001.

BACKGROUND OF THE INVENTION

The present invention relates to fiber-optic communications network equipment, and more particularly, to tilt controllers for optical amplifiers for use in fiber-optic communications links.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. For example, optical amplifiers may be used to amplify optical data signals that have been subject to attenuation over fiber-optic paths. A typical amplifier may include erbium-doped fiber coils that are pumped with diode lasers. Raman amplifiers have also been investigated. Discrete Raman amplifiers may use coils of dispersion-compensating fiber to provide Raman gain. Distributed Raman amplifiers provide gain in the transmission fiber spans that are used to carry optical data signals between network nodes.

It is an object of the present invention to provide spectral tilt controllers.

It is also an object of the present invention to provide optical network equipment such as optical amplifiers with spectral tilt controllers.

SUMMARY OF THE INVENTION

These and other objects of the invention are accomplished in accordance with the present invention by providing spectral tilt controllers for optical amplifiers and other optical network equipment for use in fiber-optic communications links in fiber-optic networks. The fiber-optic links may be used to carry optical data signals associated with wavelength-division-multiplexing channels.

The tilt controllers may be used to adjust the gain or output power spectrum of an optical amplifier or to modify the optical data signal spectrum in other optical network equipment. In an erbium-doped fiber amplifier, for example, a tilt controller may be used to adjust for the tilt created by changing inversion levels in the erbium-doped fiber or created by different signal loading conditions on a communications link.

Tilt controllers may use mechanical actuators to position a substrate relative to an optical beam. Dielectric filters or other spectral filter arrangements having various different tilt characteristics may be implemented on the same substrate. Spectral tilt and average spectral attenuation values may be adjusted using the tilt controllers if desired.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
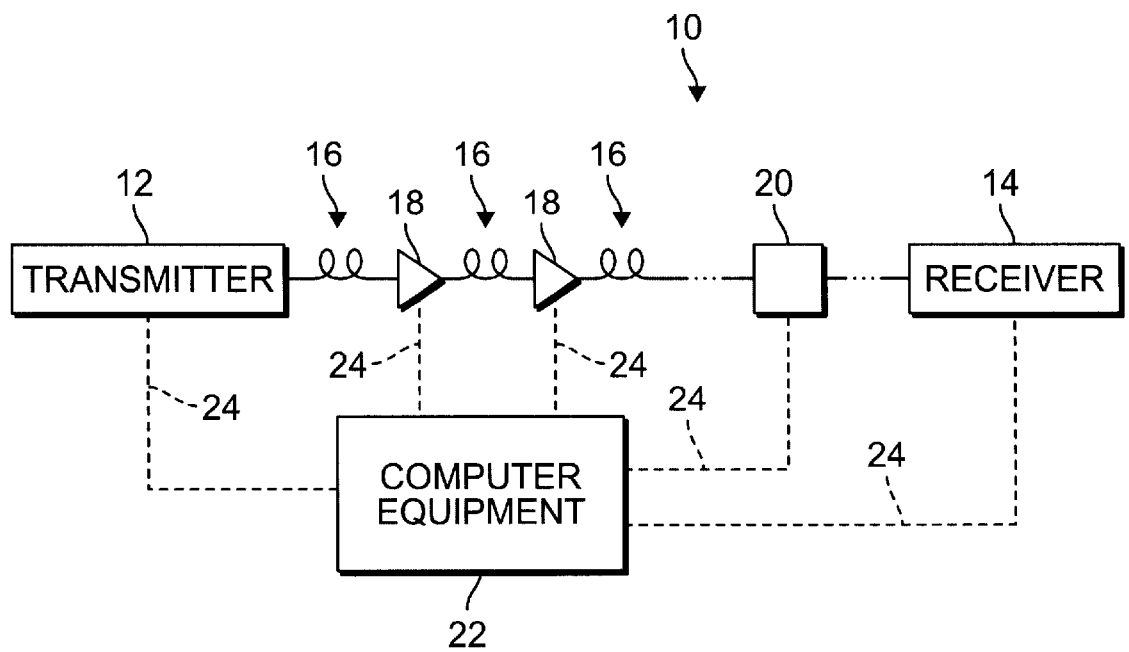
FIG. 1 is a schematic diagram of an illustrative fiber-optic communications link in accordance with the present invention.

An illustrative fiber-optic communications link 10 in an optical communications network in accordance with the present invention is shown in FIG. 1. A transmitter 12 may transmit information to a receiver 14 over a series of fiber paths. Each fiber path may include a span 16 of optical transmission fiber. Fiber spans 16 may be on the order of 40–60 km in length for long-haul networks or may be any other suitable length for use in signal transmission in an optical communications network. Link 10 may be a point-to-point link, part of a fiber ring network, or part of any other suitable network or system.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely illustrative system characteristics. If desired, fewer channels may be provided (e.g., one channel), more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., individual wavelengths or sets of wavelengths in the range of 1240–1670 nm).

Optical amplifiers 18 may be used to amplify optical signals on link 10. Optical amplifiers 18 may include booster amplifiers, in-line amplifiers, and preamplifiers. Optical amplifiers 18 may be rare-earth-doped fiber amplifiers such as erbium-doped fiber amplifiers, amplifiers that include discrete Raman-pumped coils, amplifiers that include pumps for optically pumping spans of transmission fiber 16 to create optical gain through stimulated Raman scattering, semiconductor optical amplifiers, or any other suitable optical amplifiers.

Link 10 may include optical network equipment such as transmitter 12, receiver 14, and amplifiers 18 and other optical network equipment 20 such as dispersion compensation modules, dynamic filter modules, add/drop multiplexers, optical channel monitor modules, Raman pump modules, optical switches, performance monitors, etc. For clarity, aspects of the present invention will be described primarily in the context of optical network equipment 20 having gain stages such as optical amplifiers 18. This is, however, merely illustrative. The features of the present invention may be used with any suitable optical network equipment if desired.

Computer equipment 22 may be used to implement a network management system. Computer equipment such as computer equipment 22 may include one or more computers or controllers and may be located at network nodes and one or more network management facilities. As indicated by lines 24, the network management system may communicate with optical amplifiers 18, transmitter 12, receiver 14 and other optical network equipment 20 using suitable communications paths. The communications paths may be based on any suitable optical or electrical paths. For example, communications paths 24 may include service or telemetry channel paths implemented using spans 16, may include wired or wireless communications paths, may involve communications paths formed by slowly modulating the normal data channels on link 10 at small modulation depths, etc. Paths 24 may also be used for direct communications between amplifiers 18 and other optical network equipment.

Computer equipment 22 may be used to gather spectral information from transmitter 12 (e.g., an output power spectrum), receiver 14 (e.g., a received power spectrum), and amplifiers 18 and other equipment 20 (e.g., input and output power spectra and gain spectra).

If amplifiers 18 or other equipment in link 10 have spectral adjustment capabilities, computer equipment 22 may use the gathered spectral information to determine how the spectra of amplifiers 18 and the other equipment in link 10 are to be controlled. Computer equipment 22 may issue commands to amplifiers 18, transmitters 12, receivers 14, and other equipment 20 that direct this equipment to make appropriate spectral adjustments. The spectral adjustments may be used to optimize the gain or signal spectrum flatness along link 10, may be used to optimize the end-to-end or node-to-node signal-to-noise ratio across the signal band or spectrum, or may be used to implement any other suitable control or optimization functions for link 10.

Spectral adjustments may be made in the output power of transmitter 12 by adjusting a dynamic filter or variable optical attenuators in transmitter 12 to control the output powers of the channels in transmitter 12. Transmitter spectral adjustments may also be made by adjusting the strengths of the drive currents used to drive transmitter laser sources in transmitter 12. Spectral adjustments may be made in the input power for receiver 14 by adjusting a dynamic filter or variable optical attenuators before the received signals are processed by the detectors in receiver 14.

Spectral adjustments in equipment 20 and amplifiers 18 may be made using dynamic filter arrangements, tilt controllers, individual variable optical attenuators, variable optical attenuator arrays, gain stage adjustments, other suitable spectral adjustment arrangements, or combinations of these arrangements.

Figure 2:
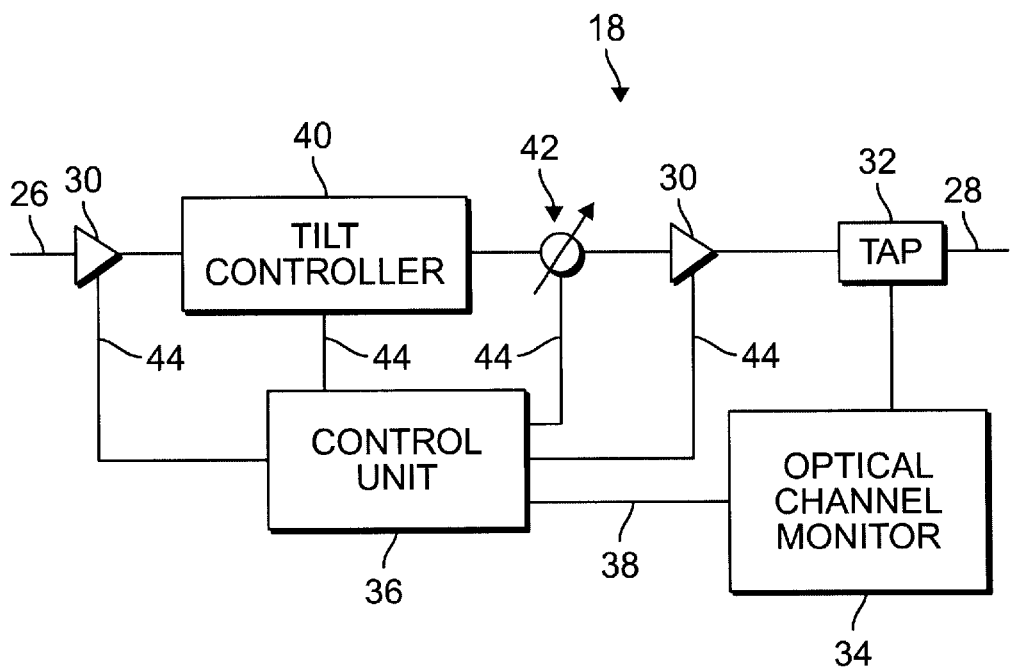
FIG. 2 is a schematic diagram of an illustrative optical amplifier having a tilt controller and optical channel monitor in accordance with the present invention.

An illustrative amplifier 18 is shown in FIG. 2. Optical signals from a span of fiber 16 may be provided to input fiber 26. Corresponding amplified output signals may be provided at output fiber 28. Optical gain may be provided by gain stages such as gain stages 30. Gain stages 30 may include, for example, one or more coils of optically-pumped rare-earth-doped fiber such as erbium-doped fiber. Pumps such as laser diode pumps or other suitable sources of pump light may be used to optically pump the erbium-doped fiber or other rare-earth-doped fiber in stages 30. Gain stages 30 that include multiple optically-pumped coils or gain media may be considered to include multiple gain substages. There may be any suitable number of gain stages 30 in amplifier 18.

The gain spectra of rare-earth-doped fiber such as erbium-doped fiber is not intrinsically flat. Accordingly, gain flattening filters may be used in one or more of gain stages 30 to modify the spectral shape of amplifier 18. For example, in erbium-doped fiber amplifiers 18, gain shaping or flattening filters may be used in one or more of gain stages 30 to help flatten or otherwise shape the gain spectrum of amplifier 18.

Tap 32 may be used to tap optical signals traveling along the main fiber path through amplifier 18. Tap 32 may be any suitable optical tap such as a 2%/98% wavelength-insensitive tap.

Tapped light from the fiber at output 28 may be provided to optical channel monitor 34. Optical channel monitor 34 or an external optical channel monitor in communication with amplifier 18 over paths 24 (FIG. 1) may make optical channel power measurements on tapped signals. In the arrangement of FIG. 2, optical channel monitor 34 may be used to measure the output channel power spectrum of amplifier 18. The gain spectrum of amplifier 18 may be measured on a channel-by-channel basis by using optical channel monitor 34 to measure tapped input light from input 26. The gain spectrum may be determined by dividing the measured input power spectrum into the measured output power spectrum. If desired, an optical switch may be used to allow a single optical channel monitor such as monitor 34 to measure both input and output power spectra.

Any suitable arrangement may be used for monitor 34. For example, monitor 34 may have a dispersive element (e.g., a prism, grating, thin-film device, arrayed waveguide device, etc.) and an optical detector array (e.g., a charge-coupled device (CCD) array or a photodiode array). If desired, more than one dispersive element may be used. Fabry-Perot etalons or other optical filters having variable optical lengths may also be used to measure the optical spectrum of the tapped light in amplifier 18. The Fabry-Perot etalons or other filters may be based on microelectromechanical systems (MEMS) devices. These are merely illustrative examples. Any suitable optical monitoring arrangement may be used if desired.

Channel power information that is gathered by optical channel monitor 34 may be provided to control unit 36 over path 38 (e.g., using serial digital communications or other suitable communications arrangement). Control unit 36 may be based on any suitable control electronics and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc.

Control unit 36 may be electrically coupled to a dynamic spectral tilt controller 40, a variable optical attenuator 42, and gain stages 30 using paths 44. This allows control unit 36 to control the operation of tilt controller 40, variable optical attenuator 42, and gain stages 30 to adjust the spectrum of amplifier 18 based on the optical signal measurements made using optical monitor 34 or an external optical channel monitor. Control unit 36 may adjust the settings of variable optical attenuator 42 to produce different amounts of attenuation (e.g., 1 dB, 2 dB, etc.). Variable optical attenuator 42 may be used, for example, when the pump power levels in gain stages 30 are being adjusted to accommodate different input power levels at input fiber 26.

If desired, other components may be used to adjust the spectrum of amplifier 18. For example, a dynamic gain equalization filter may be used that produces desired filter spectra in response to commands from control unit 36. The dynamic filter may be used with or without using variable optical attenuator 42.

Tilt controller 40 may be used to introduce various amounts of spectral tilt into the spectrum of amplifier 18. Tilt controller 40 need not have the ability to produce an arbitrary filter spectrum of the type that may be produced by a dynamic gain equalization filter. Rather, tilt controller 40 may be used to make slope adjustments to the gain or output power spectrum of amplifier 18.

The fixed gain flattening filter in gain stages 30 may be used to perform most of the flattening of the erbium-doped fiber gain spectrum of stages 30. Variable optical attenuator 42 and the pump powers in gain stages 30 may also be controlled to make spectral adjustments by changing the inversion levels in stages 30. Tilt controller 40 may be used to change the tilt or slope of the amplifier spectrum. In general, using tilt controller 40 to make spectral tilt adjustments for amplifier 18 instead of only using pump adjustments and variable optical attenuator adjustments may tend to reduce the total level of attenuation that is produced by variable optical attenuator 42 under certain input power loading conditions. As a result, the noise figure performance of a given amplifier 18 may be improved by using tilt controller 40 to make at least some portion of the spectral adjustments made in amplifier 18, rather than relying exclusively on attenuation adjustments made using variable optical attenuator 42.

The insertion loss of tilt controller 40 may be on the order of the insertion loss of variable optical attenuator 42 (e.g., about 0.2 dB to 0.4 dB). This is typically significantly less than the insertion loss for a dynamic gain equalization filter, which is generally more than 5 dB.

Although the example of FIG. 2 shows how tilt controller 40 may be used in an optical amplifier, this is merely illustrative. Tilt controller 40 may be used in any suitable optical network equipment 20 (FIG. 1) if desired.

Figure 3:
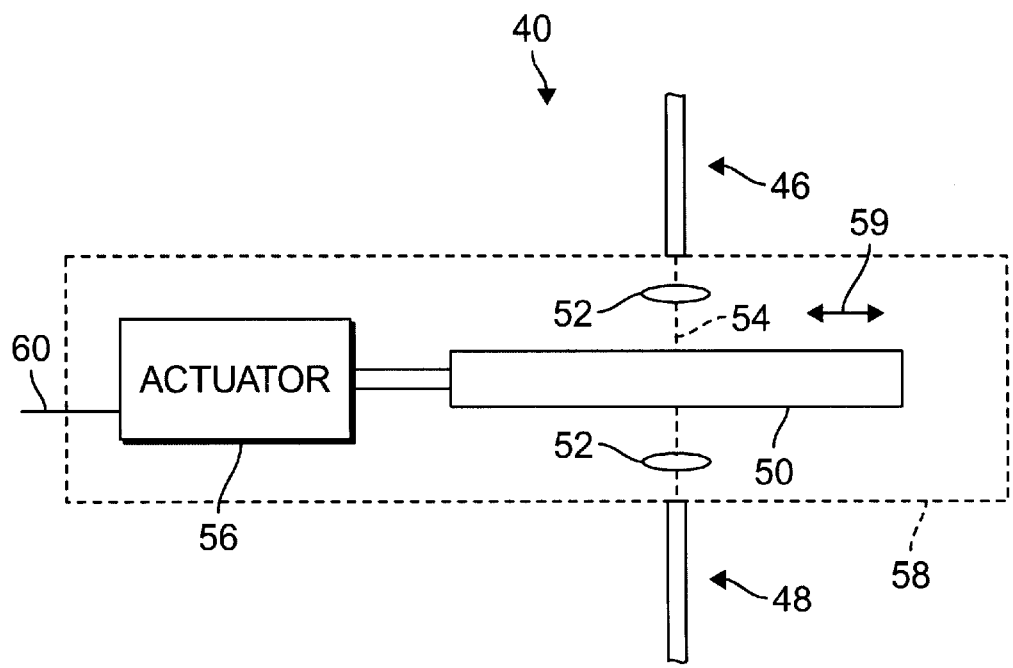
FIG. 3 is a schematic diagram of an illustrative tilt controller in accordance with the present invention.

An illustrative tilt controller 40 is shown in FIG. 3. Input light may be provided to tilt controller 40 using input fiber 46. Corresponding output light that has been spectrally filtered using tilt controller 40 may be provided at output fiber 48. Filter element 50 may be used to spectrally filter the light that passes between input fiber 46 and output fiber 48.

Light may be coupled from fiber 46 to fiber 48 through filter element 50 using lenses 52, as indicated by dotted line 54. Lenses 52 may be discrete lenses or may be integrated into fibers 46 and 48.

The illustrative configuration of FIG. 3 uses a transmissive filter element 50. If desired, a reflective filter element 50 may be used and light may be coupled to and from the input and output fibers 46 and 48 and the reflective filter element using a circulator. In such an arrangement, the circulator may be considered to be part of a transmissive tilt controller. The transmission spectrum of the tilt controller in this type of configuration is determined by the spectral reflectivity characteristics of the reflective filter element. For clarity, the present invention will be described primarily in the context of transmissive filter elements 50. This is, however, merely illustrative.

The amount of spectral tilt that is produced by tilt controller 40 of FIG. 3 may be adjusted by moving filter element 50 relative to input 46 and output 48 (i.e., forwards and backwards across line 54 along axis 59) using actuator 56. Actuator 56 may be any suitable mechanical actuator such as a linear actuator based on a screw driven by a stepper motor. Different portions of filter element 50 may have different spectral tilt characteristics. For example, filter element 50 may be configured so that different portions of filter element 50 have different transmission spectra. A desired amount of tilt may be produced by tilt controller 40 by using actuator 56 to position the appropriate portion of filter element 50 so that it intersects the light traveling along line 54.

A housing 58 or other suitable mounting structure may be used to house the components of tilt controller 40. Housing 58 may be formed from metal or plastic or other suitable mounting materials. Fibers 46 and 48 may be provided as fiber pigtails that are secured to tilt controller 40 using housing 58. An electrical port 60 (e.g., a port that uses an electrical jack, plug, wires, etc.) may be used to connect actuator 56 to control unit 36. If desired, some of the control electronics for actuator 60 may be mounted in housing 58.

Figure 4:
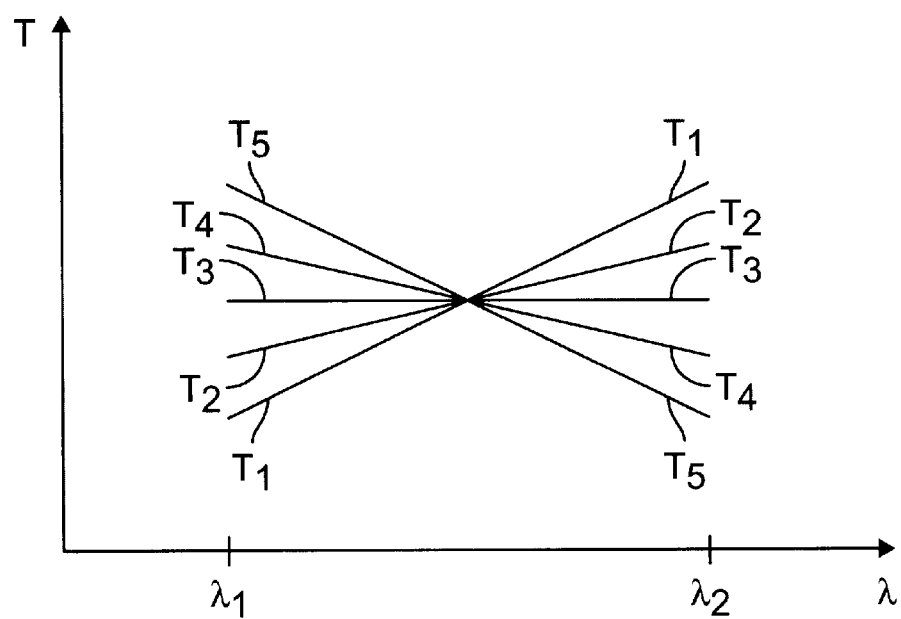
FIG. 4 is a graph of an illustrative family of transmission spectra having different spectral tilts that may be produced using a tilt controller in accordance with the present invention.

Illustrative transmission spectra that may be produced by tilt controller 40 are shown in the graph of FIG. 4. In the example of FIG. 4, tilt controller 40 may produce five different tilt spectra $T_1$, $T_2$, $T_3$, $T_4$, and $T_5$. Transmission spectra $T_1$ and $T_2$ have positive tilt and may be used to make the slope of the spectrum of amplifier 18 more positive. Transmission spectrum $T_3$ is flat and does not substantially change the tilt of the amplifier spectrum. Transmission spectrum $T_4$ and $T_5$ have negative tilt and may be used to make the slope of the spectrum of amplifier 18 more negative.

The illustrative tilt spectra of FIG. 4 are shown between wavelengths $\lambda_1$ and $\lambda_2$. This band of wavelengths may correspond to the signal band in which the optical data signals are transmitted on link 10. The transmission spectrum of filter element 40 may be linear or nearly linear in the signal band. Outside of this range (e.g., below $\lambda_1$ and above $\lambda_2$), the transmission spectra need not be linear.

Figure 5:
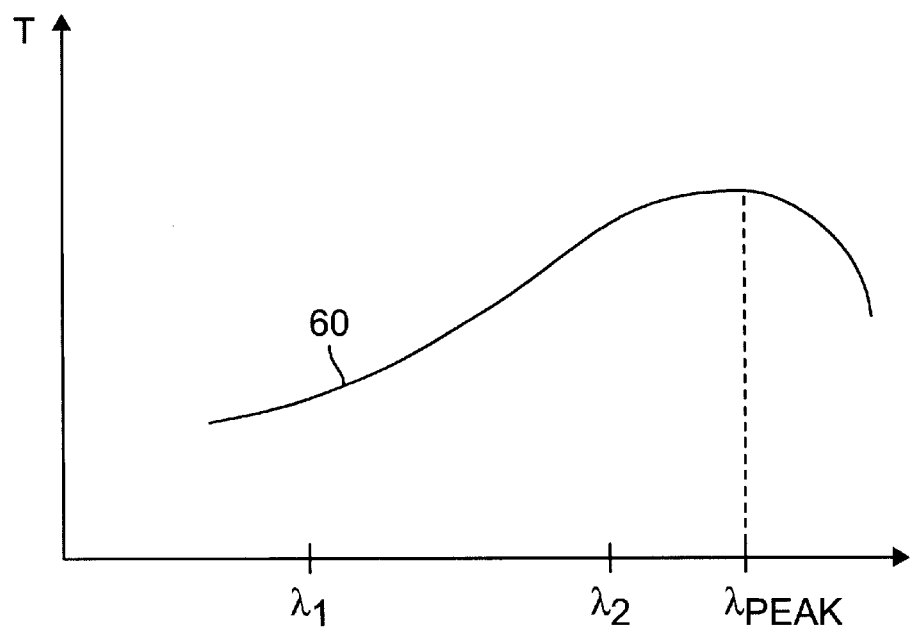
FIG. 5 is a graph of an illustrative transmission spectrum for a tilt controller filter element at a particular tilt setting in accordance with the present invention.

An illustrative transmission spectrum 60 for a particular portion of filter element 50 is shown in FIG. 5. As shown in FIG. 5, the portion of spectrum 60 between the wavelengths of $\lambda_1$ and $\lambda_2$ may be linear or nearly linear, even if the rest of spectrum 60 is not linear. The spectrum 60 of FIG. 5 may be produced by using a filter element 50 based on a transparent filter element substrate with a single layer coating or a multilayered coating (e.g., a multiple layer dielectric coating). The spectrum of FIG. 5 is merely illustrative. The transmission (or reflection) spectra produced by filter element 50 may have any suitable spectral shapes in which the tilt control spectral portions in the signal band are linear or nearly linear.

Figure 6:
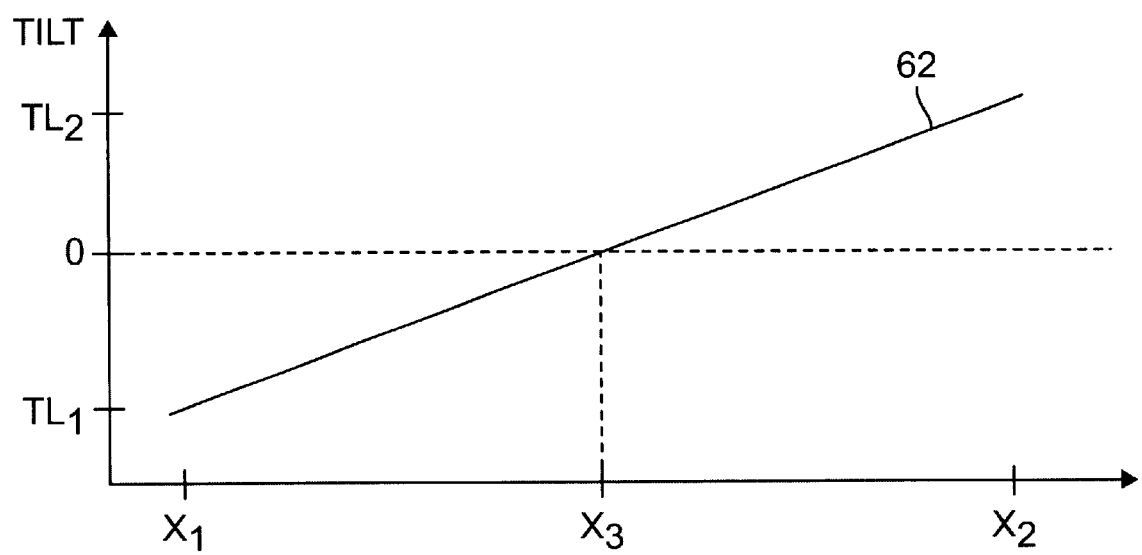
FIG. 6 is a graph showing how the spectral tilt of the filter element in a tilt controller may vary along the length of the filter element in accordance with the present invention.

Different portions of filter element 50 have different associated tilt spectra, so that the tilt of tilt controller 40 may be adjusted by changing the position of filter element 50 in tilt controller 40 using actuator 56. In one suitable arrangement, the amount of tilt that is produced by tilt controller 40 varies along the length x of filter element 50 according to the relationship shown in FIG. 6. As shown by curve 62 in the graph of FIG. 6, the amount of tilt produced by filter element 50 may vary from a negative tilt $TL_1$ at one end of filter element 50 (position $x_1$) to a positive tilt $TL_2$ at the other end of filter element 50 (position $x_2$). The spectrum of tilt controller 40 may be flat at position $x_3$ (e.g., the middle) of filter element 50. In the example of FIG. 6, the tilt variation of tilt controller 40 may be adjusted continuously by adjusting the position of filter element 50. If desired, the tilt variation along filter element 50 may be discontinuous or discontinuous in some portions and continuous in other portions. Moreover, the tilt variation along filter element 50 need not be linear. For example, the tilt variation may be linear in the center of filter 50 and may be non-linear (e.g., more rapidly varying than linear or less rapidly varying than linear) near the ends of filter 50.

Figure 7A:
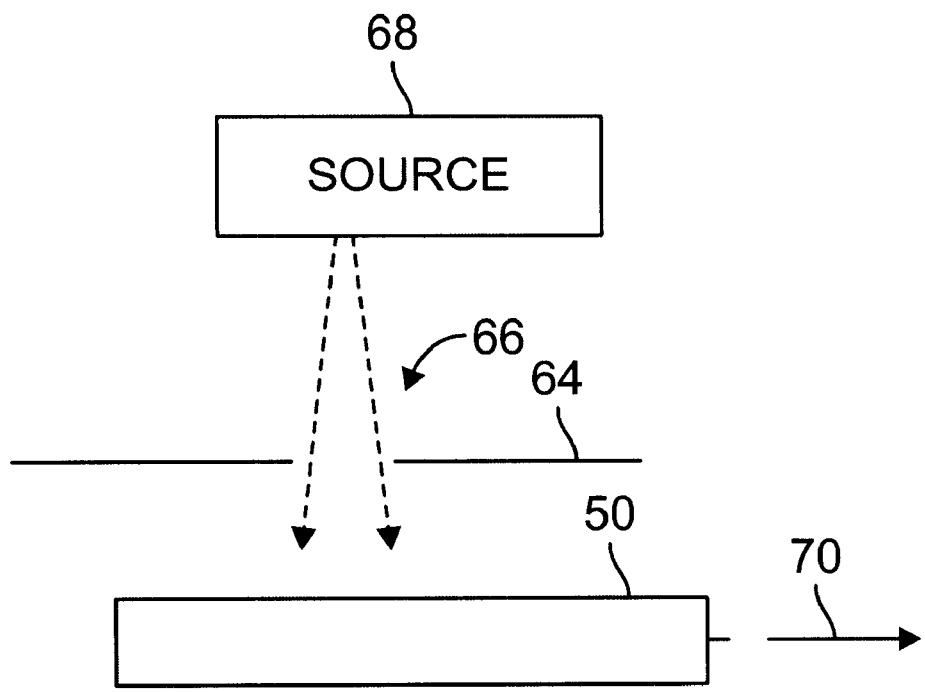
FIG. 7a is a schematic diagram of an illustrative tilt controller filter element fabrication scheme in which a filter substrate and coating source are moved relative to each other during filter fabrication in accordance with the present invention.

Any suitable fabrication techniques may be used in forming filter element 50. As an example, filter element 50 may be formed by coating transparent substrates such as glass with thin film coatings. As shown in FIG. 7a, the thickness and materials properties of the coating on filter element 50 may be varied as a function of length by controlling the movement of the filter element 50 relative to an aperture 66 in mask 64. The thickness of the coatings that are formed on filter element 50 may be controlled, for example, by controlling the speed at which filter element 50 is moved past aperture 66 in direction 70. The deposition rate or material composition of the film deposited on element 50 may be varied by controlling source 68. Source 68 may be any suitable deposition source for use in forming filter coatings on element 50. For example, source 68 may be an evaporation source, a sputtering source, a plasma source, a gaseous source, etc. Source 68 may be controlled to adjust the deposition rate of the thin film coatings for filter element 50 and to adjust the compositions of the coatings.

Figure 7B:
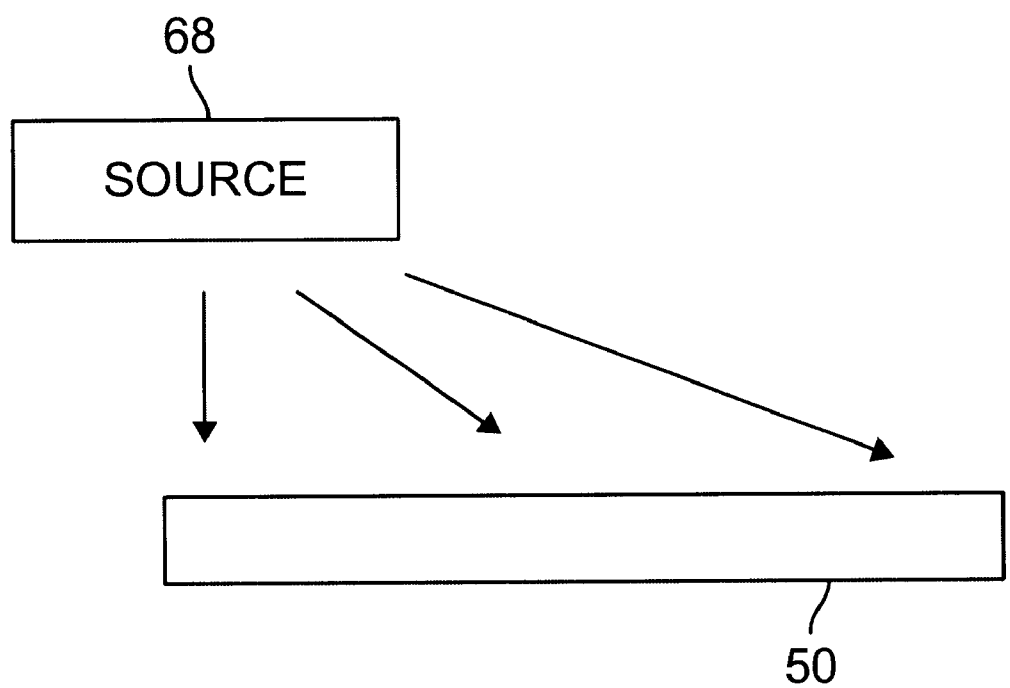
FIG. 7b is a schematic diagram of an illustrative tilt controller filter element fabrication scheme in which a filter substrate is maintained at an angle relative to the a coating source during filter fabrication in accordance with the present invention.

As shown in FIG. 7b, the substrate of filter element 50 may be placed at an oblique angle relative to source 68 during thin-film deposition. This approach may be used to create a thickness variation in the coating layers on filter element 50 as a function of distance along filter element 50.

The illustrative filter element fabrication arrangements of FIGS. 7a and 7b are merely illustrative. Any suitable technique for forming optical filters with different transmission spectra may be used to form filter elements 50 if desired.

Figure 8:
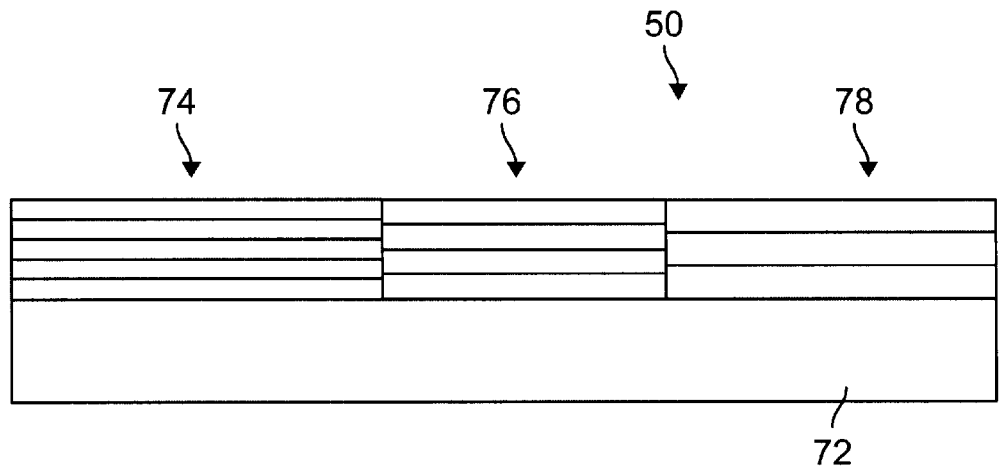
FIG. 8 is a cross-sectional side view of an illustrative tilt controller filter element formed using dielectric coating layers in which different numbers of coating layers are used to provide different spectral tilts in accordance with the present invention.

An illustrative filter element 50 having three different tilt spectra is shown in FIG. 8. Filter element 50 of FIG. 8 has a substrate 72 on which three different thin film coatings have been formed. As shown in FIG. 8, the number of coating layers in each filter portion and the thickness of each coating layer may differ. In the example of FIG. 8, the most thin film layers and the thinnest thin film layers are used in portion 74, a smaller number of somewhat thicker thin film layers are used in portion 76, and the fewest and thickest thin film layers are used in portion 78. If desired, only the film thicknesses or only the number of thin films may be varied. The processes involved in designing thin film filters with desired transmission spectra are well known and may be used in forming the coatings in the arrangement of FIG. 8 and the illustrative coatings described in connection with the other drawings.

Figure 9A:
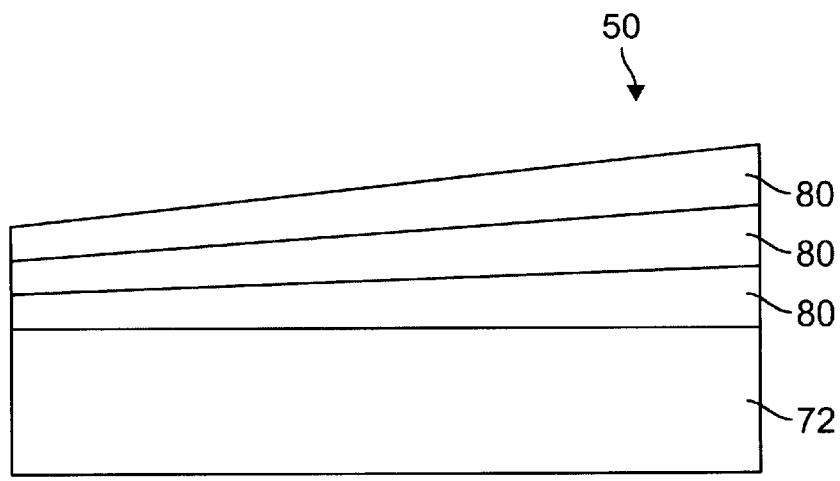
FIG. 9a is a cross-sectional side view of an illustrative tilt controller filter element formed using coating layers of continuously varying thicknesses to provide different spectral tilts in accordance with the present invention.

An illustrative filter arrangement in which the coating thickness is varied continuously as a function of position along the length of filter element substrate 72 is shown in FIG. 9a. In the example of FIG. 9a, the transmission characteristics of filter element 50 are varied by varying the layer thicknesses of the thin film coating layers 80. Three coating layers are shown in FIG. 9a, but in general any suitable number of coating layers (one or more) may be used for forming the filter elements if desired.

Figure 9B:
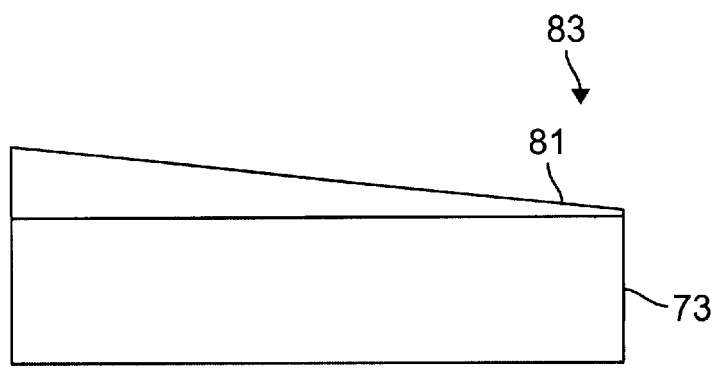
FIG. 9b is a cross-sectional side view of an illustrative variable optical attenuator element that may be included in a tilt controller to provide different amounts of wavelength-insensitive optical attenuation in accordance with the present invention.

If desired, the functions of a variable optical attenuator may be integrated into tilt controller 40. For example, filter element 50 may be placed in series with a variable optical attenuation element 83 of the type shown in FIG. 9b. Element 83 may have a substrate 73 and a coating 81 that provide element 83 with a variable amount of optical attenuation along its length. Variable optical attenuation may be created by varying the thickness of layer 81, changing the composition of layer 81, or using any other suitable approach. Element 83 and the filter element 50 of FIG. 9a may be positioned with respect to the light to be filtered by using individually-controllable actuators that are mounted in a common tilt controller housing or may be positioned using any other suitable arrangement. These approaches may be used regardless of the particular type of filter element 50 and variable optical attenuator element 83 that are used.

Figure 10:
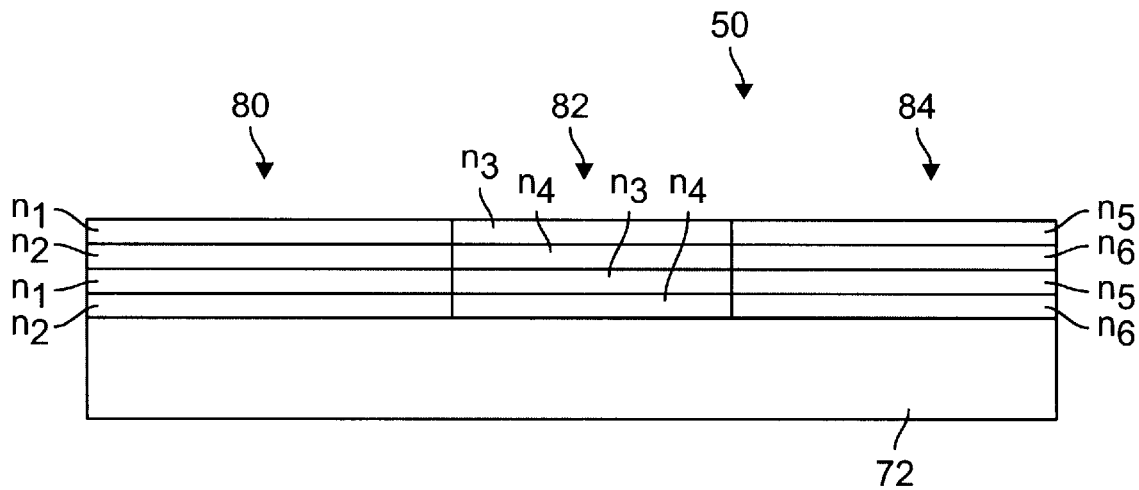
FIG. 10 is a cross-sectional side view of an illustrative tilt controller filter element formed using dielectric coating layers having various indices of refraction to provide different spectral tilts in accordance with the present invention.

As shown in FIG. 10, the composition of the thin film coating layers may be varied along the length of filter element 50. For example, the indices of refraction of the films in filter portion 80 may be $n_1$ and $n_2$, the indices of refraction of the films in filter portion 82 may be $n_3$ and $n_4$, and the indices of refraction of the films in filter portion 84 may in $n_5$ and $n_6$. In the example of FIG. 10, thin film dielectric filter arrangements have been used to create different filter spectra in each of several different portions of the filter. If desired, the composition of a single layer may be varied along the length of filter element 50 to create a series of different tilt spectra. In general, the layer thicknesses in filter 50 may be continuously or discontinuously varied along the length of filter element 50, the number of layers may be continuously or discontinuously varied along the length of filter element 50, the composition or materials properties of the thin films may be continuously or discontinuously varied along the length of filter element 50, and combinations of these approaches may be used. These are merely illustrative examples of suitable ways in which to form suitable filter elements 50 for use in producing the desired family of tilt spectra for tilt controller 40. Any suitable approaches may be used if desired.

Figure 11:
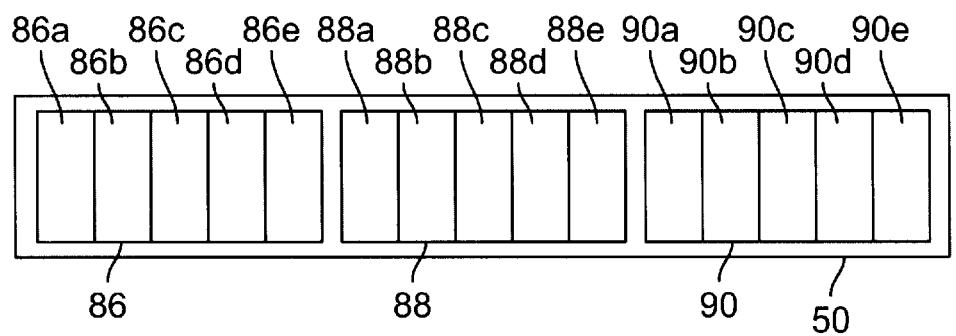
FIG. 11 is a top view of an illustrative tilt controller filter element in which different filter element sections provide different amounts of average transmission and different filter element subsections provide different amounts of tilt in accordance with the present invention.

As shown in FIG. 11, a filter element may be divided into sections and subsections. As an example, sections 86, 88, and 90 may each have a different average transmission level (and therefore a different average attenuation level). The subsections in section 86 (subsections 86a, 86b, 86c, 86d, and 86e) may each correspond to a different spectral tilt. The subsections in section 88 (subsections 88a, 88b, 88c, 88d, and 88e) may have the same tilt values as the corresponding subsections in section 86. Similarly, the subsections in section 90 (subsections 90a, 90b, 90c, 90d, and 90e) may have the same tilt values as the corresponding subsections in sections 86 and 88. With this arrangement, control unit 36 may use tilt controller 40 to produce a desired amount of attenuation by selecting an appropriate section (86, 88, or 90) and may use tilt controller 40 to produce a desired amount of tilt by selecting an appropriate subsection (a, b, c, d, or e) within that section of the filter element. If desired, the sections 86, 88, and 90 may be associated with different tilts and the subsections may be associated with different average transmission levels (attenuation levels).

Figures 12, 13:
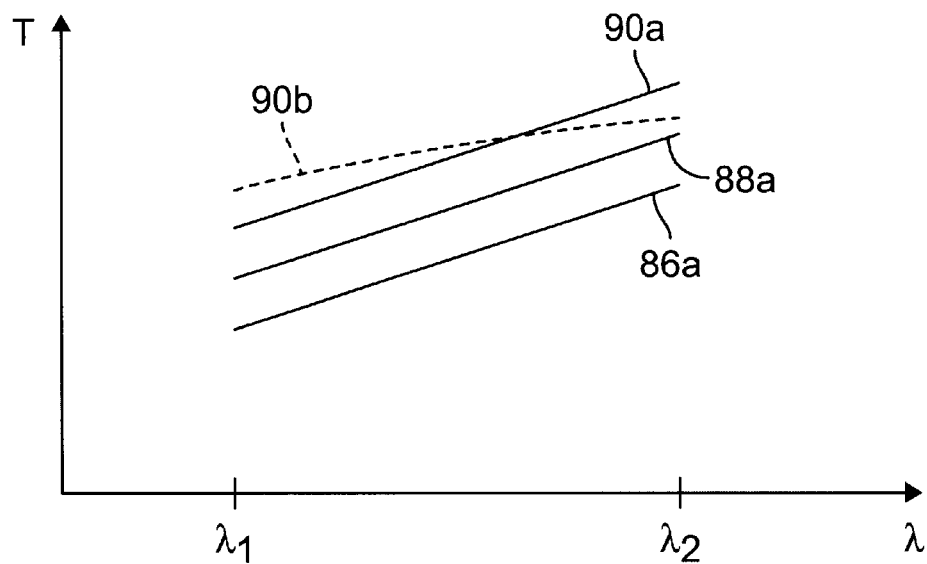
FIG. 12 is a graph showing how a tilt controller of the type shown in FIG. 11 may produce transmission spectra having different amounts of tilt and different average amounts of transmission in accordance with the present invention.
FIG. 13 is a schematic diagram showing how a tilt controller spectral filter element may have different transmission spectra arranged in a two-dimensional fashion on a filter element substrate in accordance with the present invention.

A graph showing illustrative tilt spectra that may be produced by a tilt controller 40 having a filter element of the type shown in FIG. 11 is shown in FIG. 12. Tilt spectrum 86a of FIG. 12 may be produced by subsection 86a of FIG. 11. Tilt spectrum 88a may be produced by subsection 88a of FIG. 11. Tilt spectrum 90a may be produced by subsection 90a of FIG. 11. Tilt spectrum 90b may be produced by subsection 90b of FIG. 11. By selecting an appropriate section of filter element 50 (section 86, 88, or 90), the average amount of transmission (attenuation) through tilt controller 40 may be controlled, thereby allowing tilt controller 40 to perform the functions of a variable optical attenuator. By selecting an appropriate filter subsection, the tilt produced by tilt controller 40 may be adjusted.

The filter element 50 of FIG. 11 uses a linear arrangement. This is merely illustrative. For example, filter element 50 may use a two-dimensional layout, as shown in FIG. 13. In the example of FIG. 13, different rows may perform the functions of the different filter sections of FIG. 11 and different columns may perform the functions of the different filter subsections of FIG. 11. Two perpendicular actuators or other suitable two-axis actuator arrangements may be used to position a desired portion of filter element 50 relative to the input and output fibers of controller 40. If desired, other arrangements may be used. For example, filter elements may be circular and filter sections and subsections may be arranged using circular and radial patterns. Stepper motors and other actuators may be used to select desired portions of this type of filter element.

If desired, filter elements 50 may be cascaded within a tilt controller 40 or multiple tilt controllers 40 may be cascaded within a given amplifier. By simultaneously adding the filter spectra of multiple tilt controller filter elements together in a cascaded fashion, more general spectral adjustments may be made than when a single tilt controller is used.

The gain flattening filters that are typically used to perform most of the gain flattening in erbium-doped or other rare-earth-doped fiber amplifiers may be provided as discrete filters or the gain flattening spectra of such filters may be incorporated into the filter elements in the tilt controllers. If an integrated approach is used, different portions of the filter element may have different associated filter spectra. The filter spectra at different filter positions may be combinations (superpositions) of a suitable gain flattening transmission spectrum and various different tilt spectra.

Although some of the features of the present invention have been described in the context of optical amplifiers 18, this is merely illustrative. The features of the present invention may be used in optical network equipment 20 that handles optical data signals in the signal band if desired.

It will be understood that the foregoing is merely illustrative of the principles of this invention, and that various modifications can be made by those skilled in the art without departing from the scope and spirit of the invention.

What is claimed is:

1. A spectral tilt controller for use in an optical amplifier that amplifies light in a signal band on a fiber-optic communications link, comprising:

a fiber input to which the light is provided;

a filter element that spectrally filters the light from the fiber input;

a fiber output to which the spectrally filtered light is provided; and an actuator that adjusts the position of the filter element, wherein the spectral tilt characteristics of the filter element in the signal band vary as a function of position on the filter element, so that different amounts of spectral tilt are produced by the tilt controller as the actuator adjusts the position of the filter element, wherein the actuator comprises a stepper motor and wherein the filter element comprises a glass substrate that is linearly positioned using the actuator.

2. A spectral tilt controller for use in an optical amplifier that amplifies light in a signal band on a fiber-optic communications link, comprising:

a fiber input to which the light is provided;

a filter element that spectrally filters the light from the fiber input;

a fiber output to which the spectrally filtered light is provided; and an actuator that adjusts the position of the filter element, wherein the spectral tilt characteristics of the filter element in the signal band vary as a function of position on the filter element, so that different amounts of spectral tilt are produced by the tilt controller as the actuator adjusts the position of the filter element, wherein the filter element comprises a plurality of filter sections each of which has a different average transmission across the signal band and each of which includes a plurality of filter subsections, wherein the subsections each have different associated spectral tilts, and wherein the sections and subsections are laid out on the filter element using a two-dimensional pattern.

3. An optical amplifier that amplifies signal light in a signal band on a fiber-optic communications link, comprising:

first and second optically-pumped gain stages that create optical gain that amplifies the signal light;

a spectral tilt controller between the first and second gain stages, wherein the spectral tilt controller comprises:

a fiber input with which the light is provided from the first gain stage to the spectral tilt controller;

a filter element that spectrally filters the light from the fiber input;

a fiber output with which the spectrally filtered light is provided from the filter element to the second gain stage; and an actuator that adjusts the position of the filter element, wherein the spectral tilt characteristics of the filter element in the signal band vary as a function of position on the filter element, so that different amounts of spectral tilt are produced by the tilt controller as the actuator adjusts the position of the filter element; and a control unit that adjusts the actuator to produce desired spectral tilts for the amplifier, wherein the actuator comprises a stepper motor and wherein the filter element comprises a glass substrate that is linearly positioned using the actuator.

4. An optical amplifier that amplifies signal light in a signal band on a fiber-optic communications link, comprising:

first and second optically-pumped gain stages that create optical gain that amplifies the signal light;

a spectral tilt controller between the first and second gain stages, wherein the spectral tilt controller comprises:

a fiber input with which the light is provided from the first gain stage to the spectral tilt controller;

a filter element that spectrally filters the light from the fiber input;

a fiber output with which the spectrally filtered light is provided from the filter element to the second gain stage; and an actuator that adjusts the position of the filter element, wherein the spectral tilt characteristics of the filter element in the signal band vary as a function of position on the filter element, so that different amounts of spectral tilt are produced by the tilt controller as the actuator adjusts the position of the filter element; and a control unit that adjusts the actuator to produce desired spectral tilts for the amplifier, wherein the filter element comprises a plurality of filter sections each of which has a different average transmission across the signal band and each of which includes a plurality of filter subsections, wherein the subsections each have different associated spectral tilts, and wherein the sections and subsections are laid out on the filter element using a two-dimensional pattern.

\* \* \* \* \*